(12) United States Patent
Aoki

(10) Patent No.: US 8,774,642 B2
(45) Date of Patent: Jul. 8, 2014

(54) OPTICAL TRANSMISSION APPARATUS AND OPTICAL INTERLEAVING CONTROL METHOD

(75) Inventor: Yasuhiko Aoki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 13/470,700

(22) Filed: May 14, 2012

(65) Prior Publication Data
US 2013/0004163 A1  Jan. 3, 2013

(30) Foreign Application Priority Data
Jun. 29, 2011  (JP) .................... 2011-144447

(51) Int. Cl.
*H04B 10/08* (2006.01)
*H04J 14/02* (2006.01)

(52) U.S. Cl.
USPC ............ 398/196; 398/182; 398/193; 398/195

(58) Field of Classification Search
USPC .......................... 398/182, 192–198
See application file for complete search history.

(56) References Cited

U.S. PATENT DOCUMENTS

| | | | | |
|---|---|---|---|---|
| 6,640,026 B2 * | 10/2003 | Tsuritani et al. | ............... | 385/24 |
| 6,690,853 B1 * | 2/2004 | Alaimo et al. | ................ | 385/24 |
| 6,766,074 B1 * | 7/2004 | Dingel et al. | ................ | 385/24 |
| 6,845,191 B1 * | 1/2005 | Xie et al. | ................ | 385/27 |
| 6,909,531 B2 * | 6/2005 | Frignac et al. | ............. | 359/279 |
| 6,917,760 B2 * | 7/2005 | Li et al. | ............. | 398/82 |
| 6,920,261 B2 * | 7/2005 | Inada et al. | ............. | 385/24 |
| 7,088,922 B2 * | 8/2006 | Tomofuji et al. | ............. | 398/95 |
| 7,239,772 B2 * | 7/2007 | Wang et al. | ............. | 385/17 |
| 7,333,687 B2 * | 2/2008 | Bhatia | ............. | 385/24 |
| 7,433,564 B2 * | 10/2008 | Futami et al. | ............. | 385/100 |
| 7,440,170 B2 * | 10/2008 | Kao et al. | ............. | 359/337.2 |
| 7,480,459 B2 * | 1/2009 | Nakamura et al. | ............. | 398/83 |
| 7,509,048 B2 * | 3/2009 | Turpin et al. | ............. | 398/83 |
| 7,734,180 B2 * | 6/2010 | Maeda et al. | ............. | 398/79 |
| 7,778,550 B2 * | 8/2010 | Zhang et al. | ............. | 398/95 |
| 7,869,711 B2 * | 1/2011 | Ji et al. | ............. | 398/79 |

(Continued)

FOREIGN PATENT DOCUMENTS

| | | |
|---|---|---|
| JP | 5-252582 | 9/1993 |
| JP | 11-196054 | 7/1999 |

(Continued)

OTHER PUBLICATIONS

S. Cao et al., "Interleaver Technology: Comparisons and Applications Requirements", Journal of Lightwave Technology., vol. 22, No. 1, pp. 281-289, Jan. 2004.

*Primary Examiner* — Agustin Bello
(74) *Attorney, Agent, or Firm* — Staas & Halsey LLP

(57) ABSTRACT

An optical transmission apparatus includes an interleaver configured to filter an optical carrier, a multiplexer configured to combine lights output from the interleaver to generate a composite light, a monitor configured to monitor a light intensity of the composite light, and a control circuit configured to change a grid spacing in a filter characteristic of the interleaver in a direction in which an amount of change in a light intensity of the composite light increases, on the basis of a monitoring result measured while changing a center frequency in the filter characteristic of the interleaver and to change the center frequency in the filter characteristic in a direction in which a maximum value of the light intensity increases, on the basis of the monitoring result.

6 Claims, 19 Drawing Sheets

(56) References Cited

U.S. PATENT DOCUMENTS

| | | | |
|---|---|---|---|
| 7,885,492 B2* | 2/2011 | Welch et al. | 385/14 |
| 7,907,844 B2* | 3/2011 | Levner et al. | 398/82 |
| 8,280,254 B2* | 10/2012 | Doerr | 398/79 |
| 8,620,161 B2* | 12/2013 | Yano | 398/91 |
| 2002/0034359 A1* | 3/2002 | Tsuritani et al. | 385/24 |
| 2002/0093707 A1* | 7/2002 | Katagiri et al. | 359/124 |
| 2003/0002102 A1* | 1/2003 | Khalfallah et al. | 359/124 |
| 2003/0095736 A1* | 5/2003 | Kish et al. | 385/14 |
| 2003/0123878 A1* | 7/2003 | Li et al. | 398/79 |
| 2003/0215233 A1* | 11/2003 | Tomofuji et al. | 398/41 |
| 2006/0127006 A1 | 6/2006 | Kwon et al. | |
| 2007/0116468 A1* | 5/2007 | Ji et al. | 398/79 |
| 2009/0022454 A1* | 1/2009 | Chen | 385/24 |
| 2010/0027988 A1* | 2/2010 | Hoshida et al. | 398/1 |
| 2010/0239248 A1* | 9/2010 | Doerr | 398/43 |
| 2012/0008955 A1* | 1/2012 | Shen et al. | 398/79 |
| 2012/0170937 A1* | 7/2012 | Van Leeuwen | 398/76 |
| 2012/0321248 A1* | 12/2012 | Chien et al. | 385/31 |
| 2013/0004163 A1* | 1/2013 | Aoki | 398/34 |
| 2013/0266313 A1* | 10/2013 | Shen et al. | 398/34 |

FOREIGN PATENT DOCUMENTS

| | | |
|---|---|---|
| JP | 3940083 | 4/2007 |
| JP | 2007-114809 | 5/2007 |
| JP | 3940083 | 7/2007 |
| WO | WO 02/091634 | 11/2002 |

* cited by examiner

FIG. 2
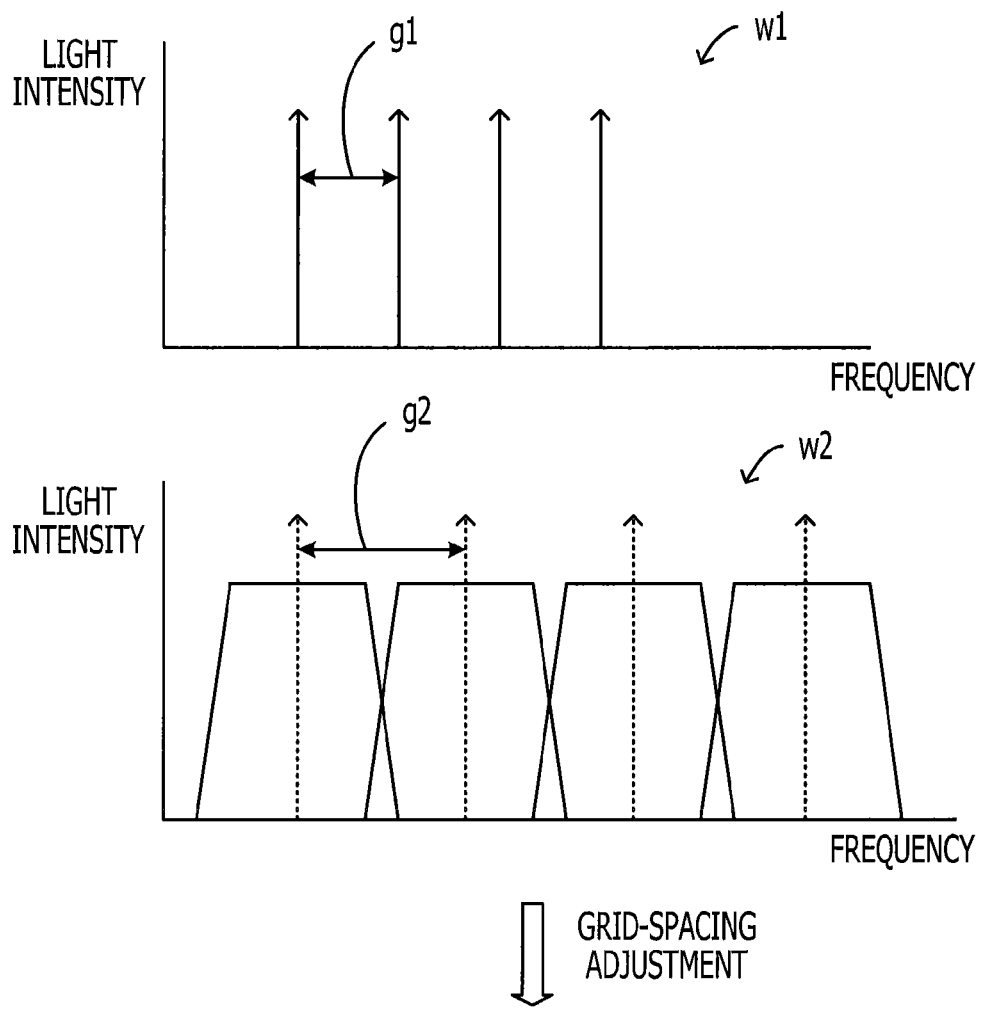
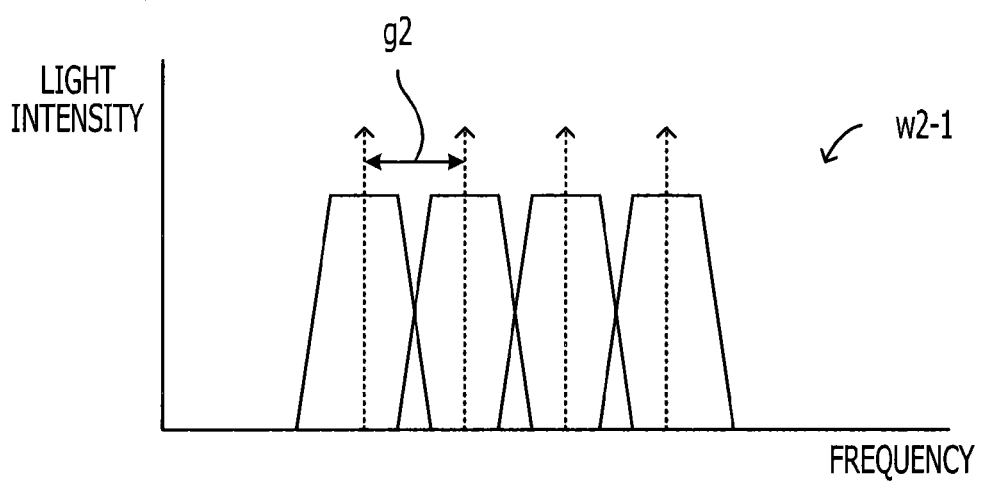

100
OPTICAL TRANSMISSION APPARATUS AND OPTICAL INTERLEAVING CONTROL METHOD

CROSS-REFERENCE TO RELATED APPLICATION

This application is based upon and claims the benefit of priority of the prior Japanese Patent Application No. 2011-144447, filed on Jun. 29, 2011, the entire contents of which are incorporated herein by reference.

FIELD

The embodiments discussed herein are related to an optical transmission apparatus and an optical interleaving control method.

BACKGROUND

Transmission capacity of an optical transmission system that uses the wavelength division multiplexing (WDM) technology has increased in recent years. For example, standardization, including optical channel transport unit 4 (OTU4), which transfers a client signal in Ethernet (registered mark) of a transmission speed per channel of the 100 Gbit/s class, is proceeding.

An example of a developed optical modulation scheme for transmitting a 100 Gbit/s signal over a long distance is a dual polarization quadrature phase shift keying (DP-QPSK) modulation and demodulation technique, which performs four-level phase modulation on orthogonal polarized waves propagating through an optical fiber.

To address a further increase in transmission capacity, application of a multilevel modulation scheme of four or more levels, such as 16 quadrature amplitude modulation (16QAM) is being pursued.

Also, an example of the related technique is adjustment of the degree of optical modulation on the basis of a transmission error rate as explained in, for example, Japanese Patent No. 3940083.

An example of the apparatus used in generating optical signals with a predetermined frequency spacing is an interleaver. An interleaver has the function of changing a frequency spacing (grid spacing) of optical signals and separating the wavelengths of (interleaving) the signals for individual optical modulators. Unfortunately, the interleaver can interleave signals only in a fixed band range.

As in an example case in which optical signals with 50 GHz (corresponding to the wavelength 0.4 nm) spacing are interleaved with optical signals with 200 GHz (corresponding to the wavelength 1.6 nm), interleaving is allowed only in a fixed band range, and control for interleaving in a bandwidth variable manner has not been established.

Thus, optical transmission in a plurality of optical modulation schemes with different frequency spacings has to prepare a plurality of interleavers that can deal with the optical modulation schemes and carrier frequency spacings, and this raises a problem of increasing the system scale, power consumption, cost, and other factors.

SUMMARY

According to an aspect of the invention, an optical transmission apparatus includes an interleaver configured to filter an optical carrier, a multiplexer configured to combine lights output from the interleaver to generate a composite light, a monitor configured to monitor a light intensity of the composite light, and a control circuit configured to change a grid spacing in a filter characteristic of the interleaver in a direction in which an amount of change in a light intensity of the composite light increases, on the basis of a monitoring result measured while changing a center frequency in the filter characteristic of the interleaver and to change the center frequency in the filter characteristic in a direction in which a maximum value of the light intensity increases, on the basis of the monitoring result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates grid-spacing adjustment;

DESCRIPTION OF EMBODIMENTS

For an optical communication network, it is important to apply an optimal optical modulation scheme according to transmission capacity, transmission distance, or other quantity. A bandwidth variable interleaving technique that can support a plurality of optical modulation schemes using a single apparatus has to be used.

Figure 1:
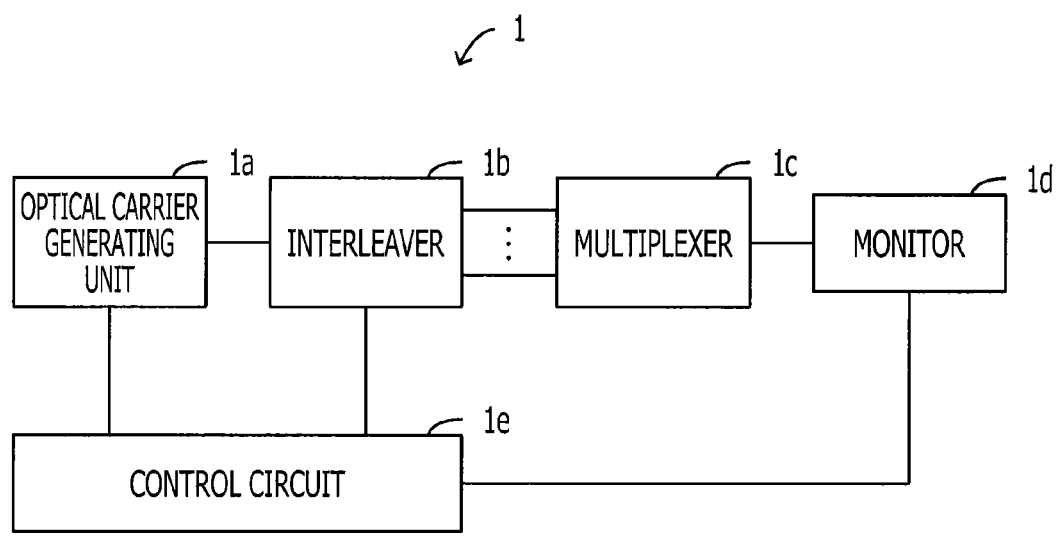
FIG. 1 illustrates an example configuration of an optical transmission apparatus.

Embodiments are described below with reference to the drawings. FIG. 1 illustrates an example configuration of an optical transmission apparatus. An optical transmission apparatus 1 includes an optical carrier generating unit 1a, an interleaver 1b, a multiplexer 1c, a monitor 1d, and a control circuit 1e.

The optical carrier generating unit 1a generates an optical carrier (optical carrier wave signal) with periodicity of a standard grid spacing, the standard grid spacing being the grid spacing of a frequency that is set on the basis of a frequency setting signal in which the frequency is variably set. The optical carrier generating unit 1a may be a light source.

The interleaver 1b filters and interleaves optical carriers. Specifically, the interleaver 1b varies the grid spacing in a filter characteristic (transmission characteristic) and the center frequency in the filter characteristic on the basis of a control signal sent from the control circuit 1e and filters input optical carriers using the filter characteristic and interleaves them.

The multiplexer 1c combines lights output from the interleaver 1b to generate a composite light. The monitor 1d monitors the light intensity of the composite light.

The control circuit 1e generates a frequency setting signal and a control signal and outputs them. The control circuit 1e also changes the grid spacing in the filter characteristic of the interleaver 1b in the direction in which the amount of change in the light intensity of the composite light increases and changes the center frequency in the filter characteristic in the direction in which the maximum value of the light intensity increases, on the basis of a monitoring result of measuring while changing the center frequency of the filter of the interleaver 1b.

Specifically, the control circuit 1e calculates the difference between a peak value and a bottom value of a composite light and varies the grid spacing in the filter characteristic of the interleaver 1b in the direction in which that difference is the largest. In addition, the control circuit 1e varies the center frequency in the filter characteristic of the interleaver 1b in the direction in which the peak value of the composite light is the highest.

In that case, the control circuit 1e performs, on the interleaver 1b, grid-spacing adjustment of equalizing the grid spacing in the filter characteristic with the standard grid spacing. In addition, the control circuit 1e performs center-frequency adjustment of equalizing the center frequency in the filter characteristic with the center frequency of an optical carrier output from the optical carrier generating unit 1a.

Next, the grid-spacing adjustment and the center-frequency adjustment are described. FIG. 2 illustrates an example of the grid-spacing adjustment. A waveform spectrum w1 represents optical carriers with periodicity of a standard grid spacing g1 output from the optical carrier generating unit 1a. The vertical axis indicates the light intensity, and the horizontal axis indicates the frequency. A waveform spectrum w2 represents a filter characteristic of the interleaver 1b. The vertical axis indicates the light intensity, and the horizontal axis indicates the frequency.

The standard grid spacing g1 is the spacing between center frequencies (indicated by the arrows of the solid lines in FIG. 2) of the optical carriers. A grid spacing g2 in the filter characteristic of the interleaver 1b is the spacing between the center frequencies (indicated by the arrows of the dotted lines in FIG. 2) of spectrums (transmission spectrums) in the filter characteristic.

The grid-spacing adjustment is adjustment for equalizing the standard grid spacing g1 of the optical carriers and the grid spacing g2 in the filter characteristic of the interleaver 1b.

For example, a case where the grid spacing g2 is currently larger than the standard grid spacing g1 (grid spacing g2>standard grid spacing g1) is discussed. In this case, variable adjustment of equalizing the grid spacing g2 in the filter characteristic of the interleaver 1b with the standard grid spacing g1 is carried out on the basis of a control signal supplied from the control circuit 1e. A waveform spectrum w2-1 indicates the state in which the standard grid spacing g1 and the grid spacing g2 are the same.

Figure 3:
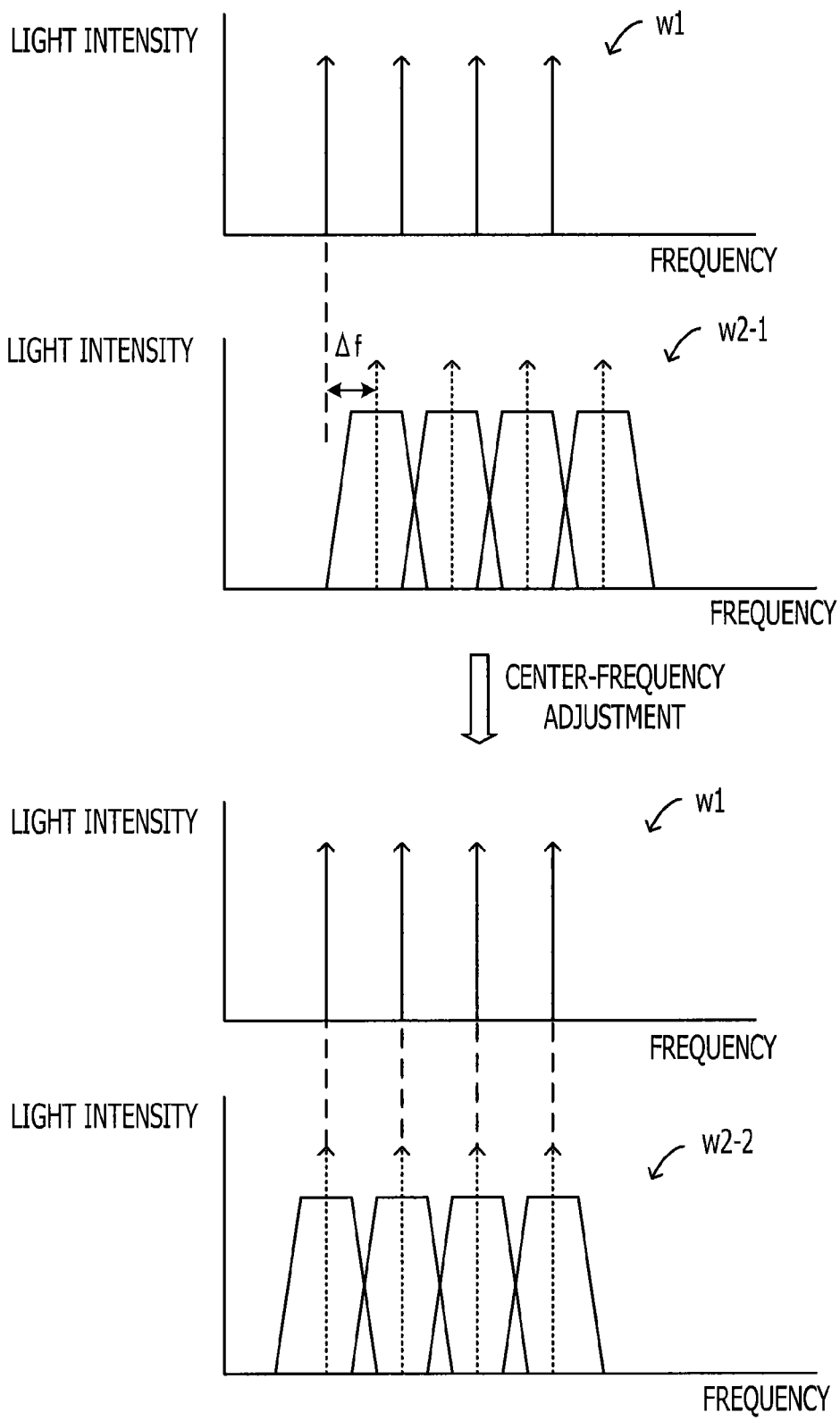
FIG. 3 illustrates center-frequency adjustment.

FIG. 3 illustrates an example of the center-frequency adjustment. The center-frequency adjustment is carried out after the grid spacing g2 in the filter characteristic of the interleaver 1b is equalized with the standard grid spacing g1 of optical carriers by the grid-spacing adjustment illustrated in FIG. 2. The center-frequency adjustment is adjustment for equalizing the center frequency of the optical carriers and the center frequency of the spectrum in the filter characteristic of the interleaver 1b.

For example, a case where the center frequency of the spectrum in the filter characteristic deviates by Δf from the center frequency of the optical carriers toward higher frequencies, as indicated by the waveform spectrums w1 and w2-1, is discussed. In this case, variable adjustment of shifting the center frequency in the filter characteristic of the interleaver 1b by Δf toward lower frequencies so as to equalize it with the center frequency of the optical carriers is carried out on the basis of a control signal supplied from the control circuit 1e. A waveform spectrum w2-2 indicates the state where the center frequency of the optical carriers and the center frequency of the spectrum in the filter characteristic of the interleaver 1b are the same.

Figure 4:
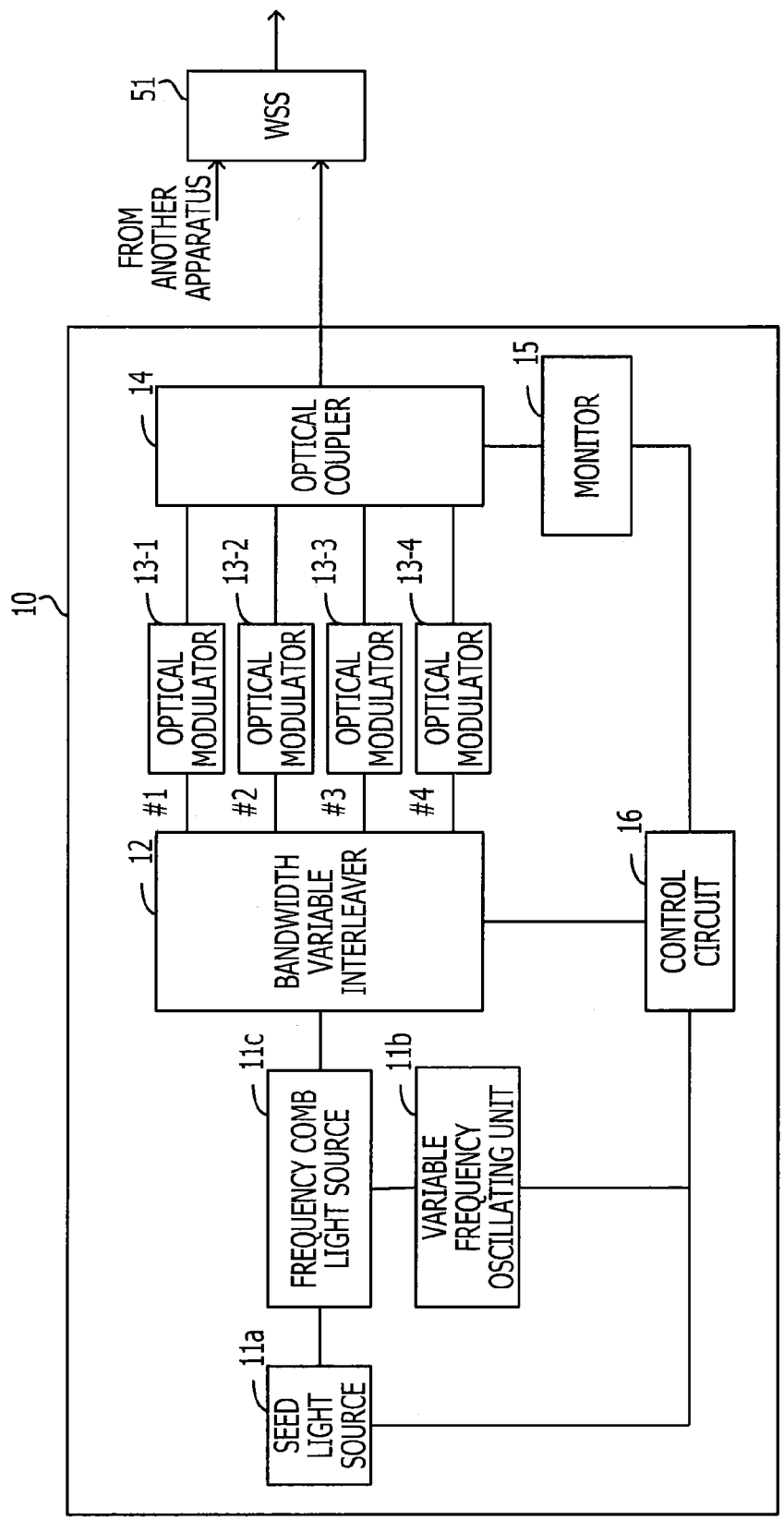
FIG. 4 illustrates an example configuration of another optical transmission apparatus.

Next, an example configuration of another optical transmission apparatus is described. FIG. 4 illustrates an example configuration of the optical transmission apparatus. An optical transmission apparatus 10 includes a seed light source 11a, a variable frequency oscillating unit 11b, a frequency comb light source 11c, a bandwidth variable interleaver 12, optical modulators 13-1 to 13-4, an optical coupler 14, a monitor 15, and a control circuit 16.

The seed light source 11a, variable frequency oscillating unit 11b, and frequency comb light source 11c correspond to a component that achieves the function of the optical carrier generating unit 1a illustrated in FIG. 1. The bandwidth variable interleaver 12 corresponds to the interleaver 1b illustrated in FIG. 1. The optical coupler 14 corresponds to the multiplexer 1c illustrated in FIG. 1. The monitor 15 corresponds to the monitor id illustrated in FIG. 1. The control circuit 16 corresponds to the control circuit 1e illustrated in FIG. 1.

The seed light source 11a is a wavelength tunable light source and emits continuous light having a wavelength that is specified on the basis of a wavelength setting instruction from the control circuit 16. The variable frequency oscillating unit 11b outputs a frequency signal having a frequency that is specified on the basis of a frequency setting signal output from the control circuit 16. The frequency comb light source 11c modulates a light emitted from the seed light source 11a using a frequency signal and outputs optical carriers with periodicity of a plurality of wavelengths.

Assuming that optical transmission under the orthogonal frequency division multiplexing (OFDM) scheme used as an optical multiplexing scheme is carried out, the control circuit 16 sends a frequency setting signal of 25 GHz to the variable frequency oscillating unit 11b. The variable frequency oscillating unit 11b outputs a frequency signal of 25 GHz on the basis of that frequency setting signal. The frequency comb light source 11c modulates a light from the seed light source 11a using the frequency signal of 25 GHz and outputs optical carriers at 25 GHz intervals (outputs optical carriers every 25 GHz interval).

Alternatively, in the case of optical transmission under the WDM scheme, the control circuit 16 sends a frequency setting signal of 50 GHz to the variable frequency oscillating unit 11b. The variable frequency oscillating unit 11b outputs a frequency signal of 50 GHz on the basis of that frequency setting signal. The frequency comb light source 11c modulates a light from the seed light source 11a using the frequency signal of 50 GHz and outputs optical carriers at 50 GHz intervals (outputs optical carriers every 50 GHz interval).

The bandwidth variable interleaver 12 varies the grid spacing and the center frequency in the filter characteristic and varies the frequency band in the filter characteristic on the basis of a control signal output from the control circuit 16 to apply appropriate optical modulation in the optical modulators 13-1 to 13-4 at a subsequent stage to the optical carriers output from the frequency comb light source 11c.

The bandwidth variable interleaver 12 filters the input optical carriers using the filter characteristic having the grid spacing and center frequency in which the bandwidth has been varied and interleaves (reduces) the optical carriers through predetermined ports #1 to #4.

The optical modulators 13-1 to 13-4 individually modulate the input optical carriers. The optical coupler 14 combines the optically modulated optical signals, splits the composite into two composite lights, and outputs them. One of the two composite lights is sent to a wavelength selective switch (WSS) 51, which is a subsequent processing unit. The other composite light is sent to the monitor 15. The monitor 15 monitors the wavelength dependence of the light intensity of a composite light.

The control circuit 16 provides the seed light source 11a with a wavelength setting instruction for a wavelength to be set. The control circuit 16 outputs a frequency setting signal that corresponds to a used multiplexing scheme to the variable frequency oscillating unit 11b. For example, for OFDM, the control circuit 16 outputs a frequency setting signal of 25 GHz; for WDM, the control circuit 16 outputs a frequency setting signal of 50 GHz.

The control circuit 16 generates a control signal for use in grid-spacing adjustment and center-frequency adjustment on the basis of a monitoring result obtained by the monitor 15, outputs the control signal to the bandwidth variable interleaver 12, and variably controls the bandwidth of the bandwidth variable interleaver 12.

The control circuit 16 is connectable to a maintenance terminal (not illustrated) and specifies the settings in the apparatus on the basis of setting information from the maintenance terminal. The control circuit 16 also controls displaying of an operation state to the maintenance terminal.

Next, a waveform spectrum of each of the output characteristic of the frequency comb light source 11c, the filter characteristic of the bandwidth variable interleaver 12, and the output characteristic of the WSS 51 is described.

As examples of optical transmission with 400 Gbps, OFDM optical transmission mode (25 GHz intervals, 4 subcarriers×100 Gbps) and WDM optical transmission mode (50 GHz intervals, 4-channel WDM light) are described below.

(1) OFDM Optical Transmission Mode

Figure 5:
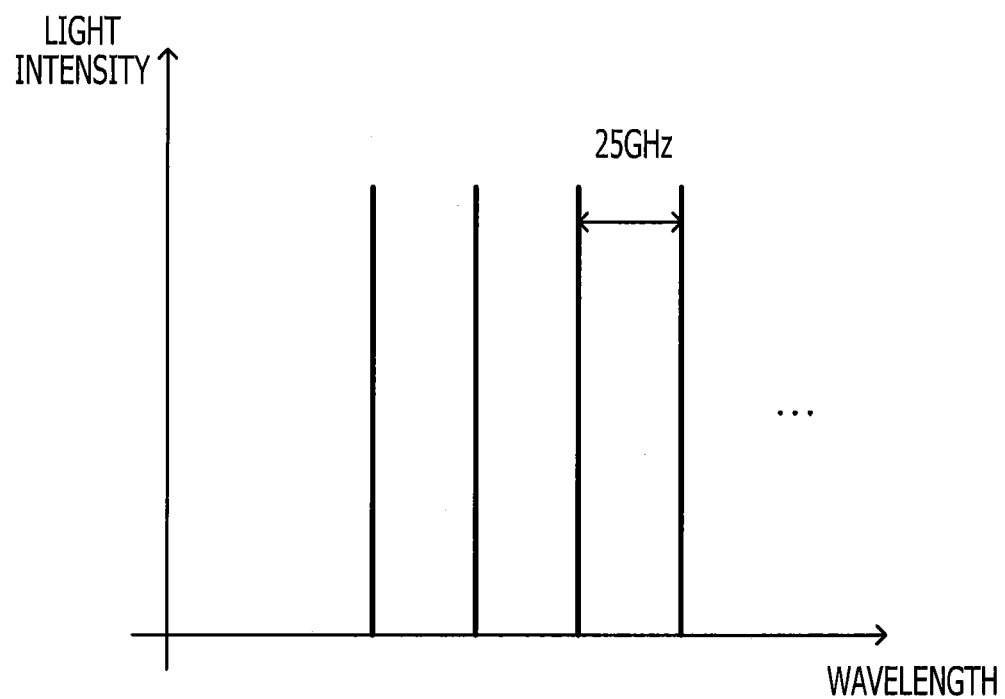
FIG. 5 illustrates an output characteristic of a frequency comb light source.

FIG. 5 illustrates an output characteristic of the frequency comb light source. The vertical axis indicates the light intensity and the horizontal axis indicates the wavelength. For the OFDM scheme, optical carriers are output from the frequency comb light source 11c at intervals of 25 GHz.

Figure 6:
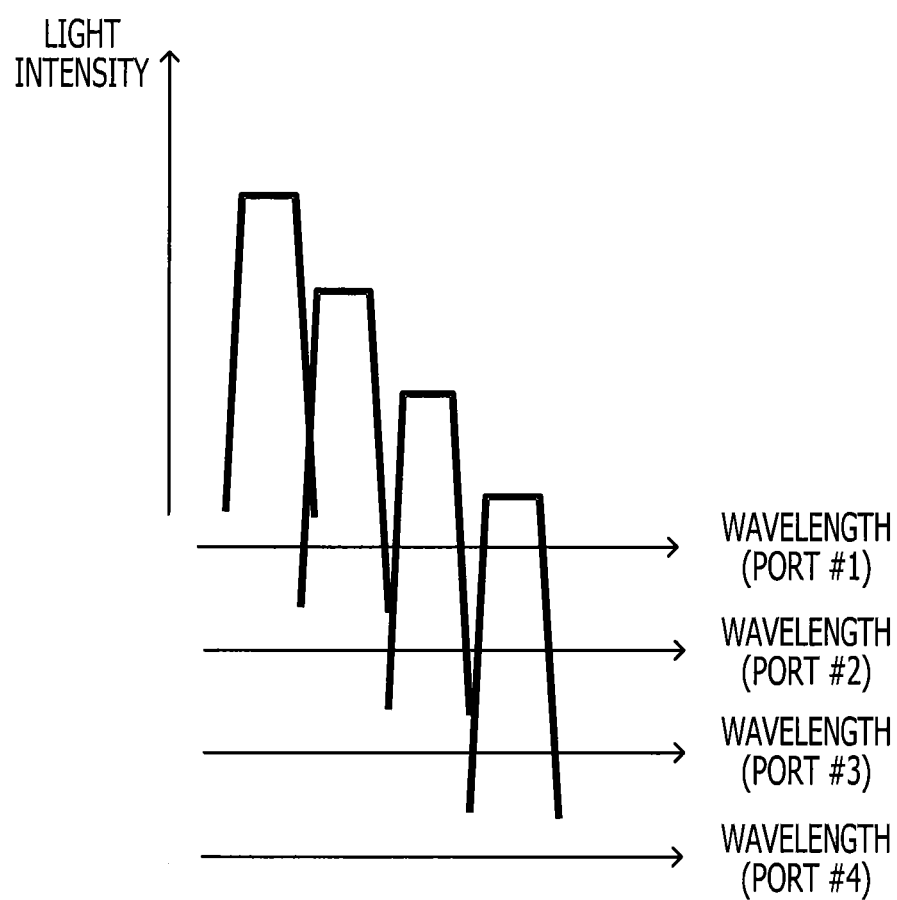
FIG. 6 illustrates a filter characteristic of a bandwidth variable interleaver.

FIG. 6 illustrates a filter characteristic of the bandwidth variable interleaver. The vertical axis indicates the light intensity and the horizontal axis indicates the wavelength. The horizontal axis includes the wavelength axes for the respective ports #1 to #4 of the bandwidth variable interleaver 12 (the filter characteristic is hierarchically illustrated on a port basis). Optical carriers having different center frequencies are output in an interleaving way through the respective ports #1 to #4 of the bandwidth variable interleaver 12.

Figure 7:
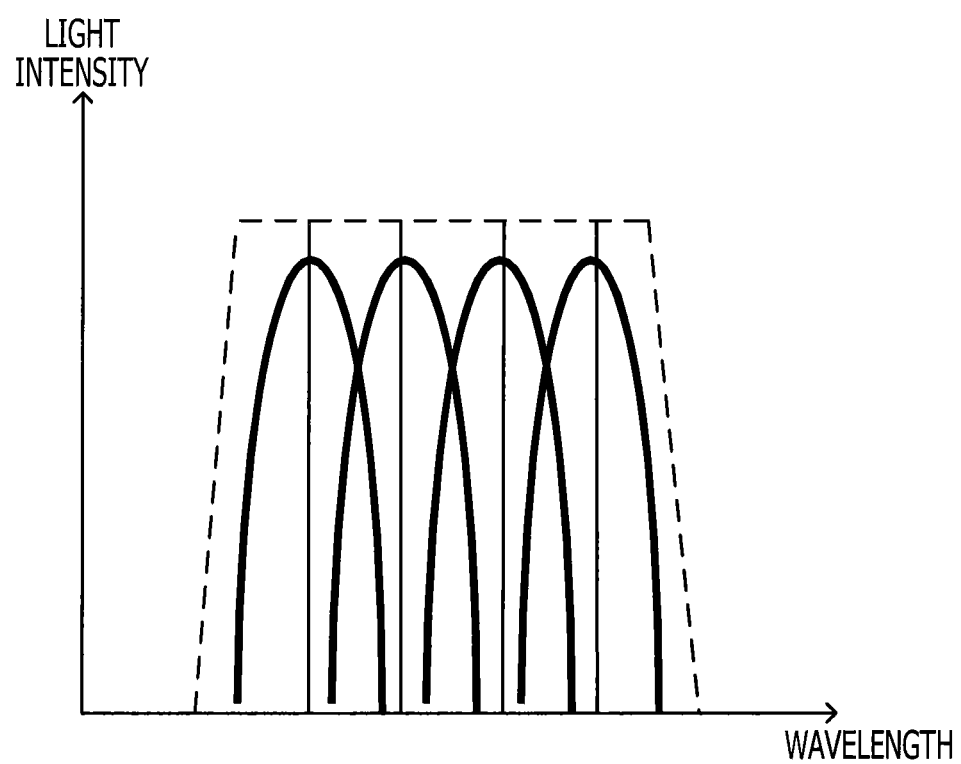
FIG. 7 illustrates an output characteristic of a wavelength selective switch (WSS)

FIG. 7 illustrates an output characteristic of the WSS. The vertical axis indicates the light intensity and the horizontal axis indicates the wavelength. The dotted lines indicate a transmission range of the WSS 51.

(2) WDM Optical Transmission Mode

Figure 8:
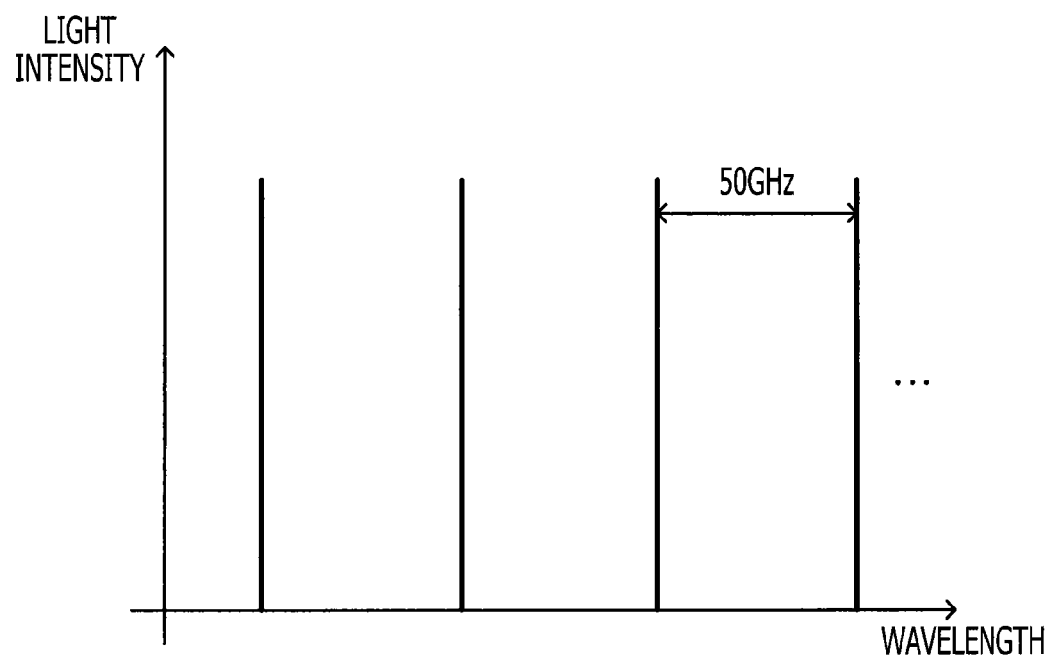
FIG. 8 illustrates an output characteristic of the frequency comb light source.

FIG. 8 illustrates an output characteristic of the frequency comb light source. The vertical axis indicates the light intensity and the horizontal axis indicates the wavelength. For the WDM scheme, optical carriers are output from the frequency comb light source 11c at intervals of 50 GHz.

Figure 9:
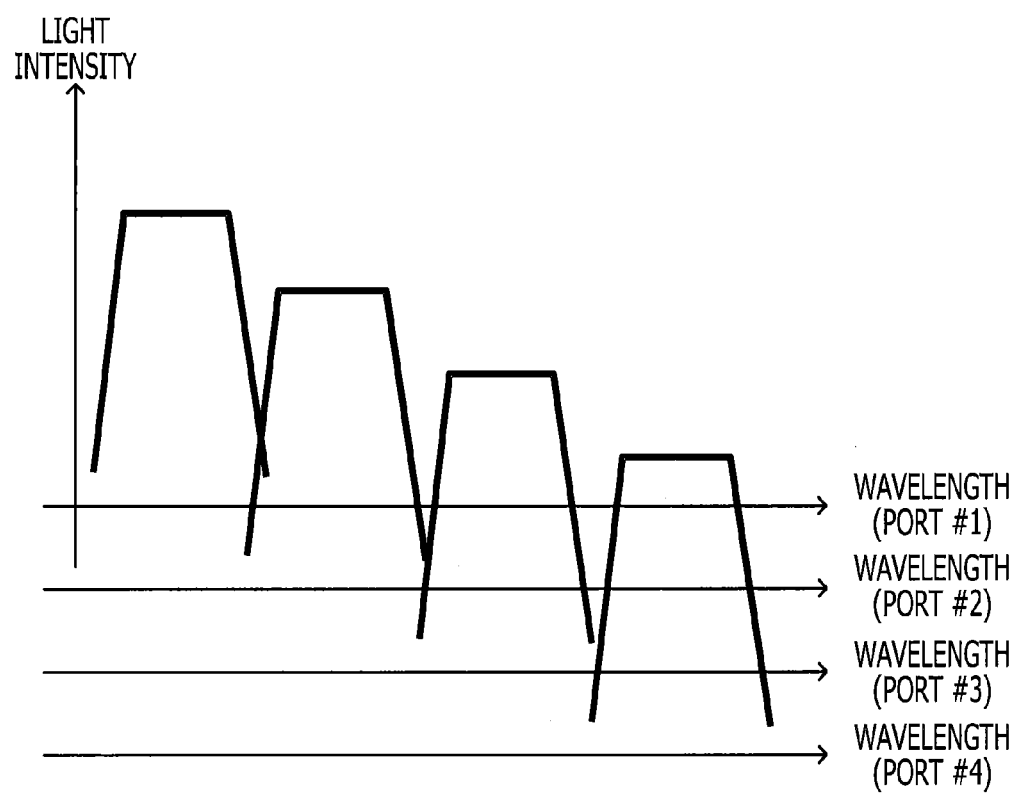
FIG. 9 illustrates a transmission characteristic of the bandwidth variable interleaver.

FIG. 9 illustrates a transmission characteristic of the bandwidth variable interleaver. The vertical axis indicates the light intensity and the horizontal axis indicates the wavelength. The horizontal axis includes the wavelength axes for the respective ports #1 to #4 of the bandwidth variable interleaver 12 (the filter characteristic is hierarchically illustrated on a port basis). Optical carriers having different center frequencies are output in an interleaving way through the respective ports #1 to #4 of the bandwidth variable interleaver 12.

Figure 10:
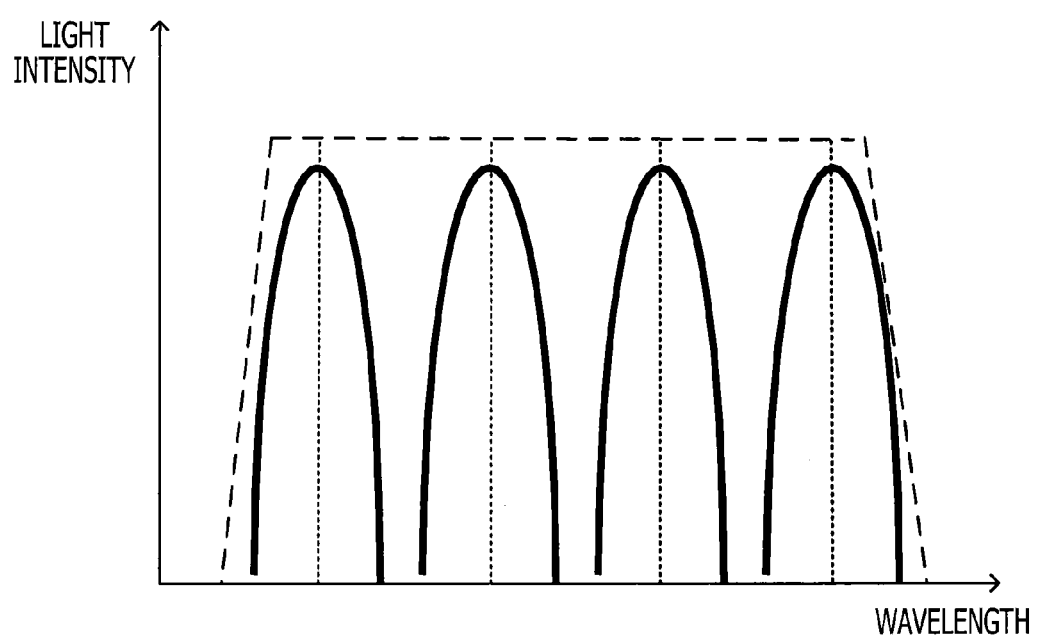
FIG. 10 illustrates an output characteristic of the WSS.

FIG. 10 illustrates an output characteristic of the WSS. The vertical axis indicates the light intensity and the horizontal axis indicates the wavelength. The dotted lines indicate a transmission region of the WSS 51.

In the output characteristic of the WSS 51 illustrated in FIG. 7, there are overlaps in the optical carriers under the OFDM scheme within the transmission region of the WSS 51. Under the OFDM scheme, because the optical carriers are orthogonal to each other, the channels can be separated in subsequent processing and thus an overlap between the channels is permitted. In contrast, in the output characteristic of the WSS 51 illustrated in FIG. 10, no overlaps occur in the optical carriers in the WDM scheme. This is because an overlapping section will lead to a crosstalk under the WDM scheme.

As described above, even in optical transmission with the same 100 Gbps, the OFDM scheme has higher frequency efficiency because the channel gap can be narrowed, and the WDM scheme has a higher optical signal-to-noise (S/N) ratio and is suitable for long-distance transmission because no overlaps occur between the channels.

Figure 11:
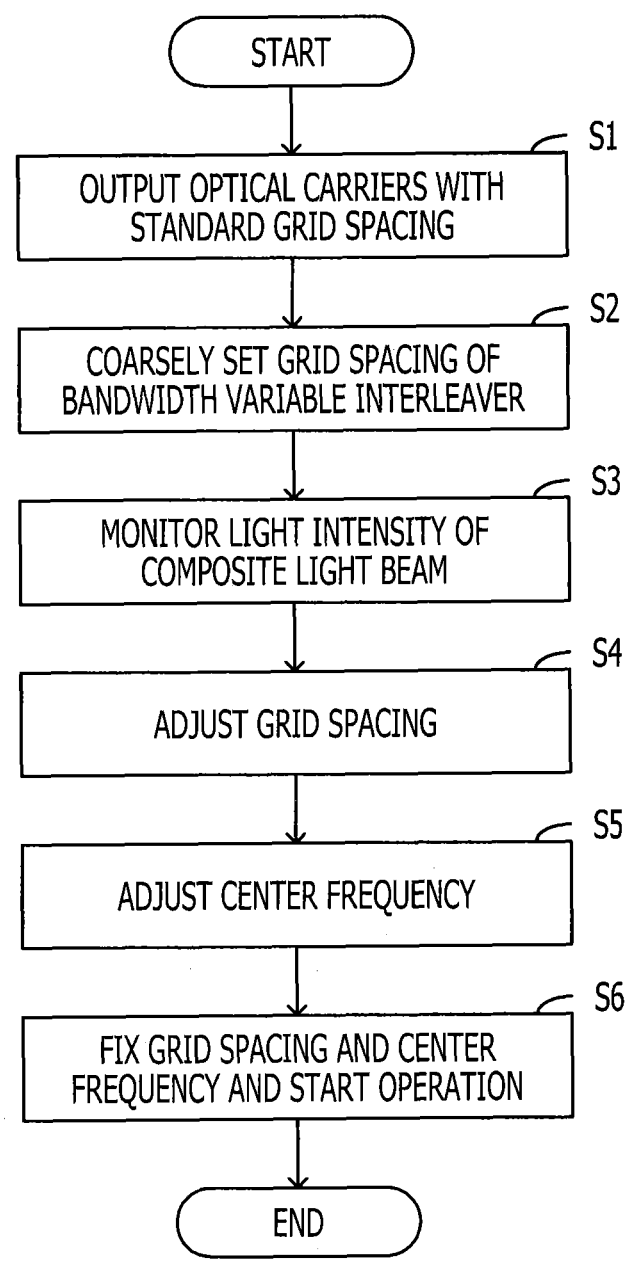
FIG. 11 illustrates a control sequence of bandwidth variable interleaving.

Next, bandwidth variable interleaving control is described. FIG. 11 illustrates a control sequence of the bandwidth variable interleaving.

[S1] The frequency comb light source 11c modulates a light emitted from the seed light source 11a using a frequency signal output from the variable frequency oscillating unit 11b and outputs optical carriers with periodicity of the desired standard grid spacing g1 set by the frequency signal.

[S2] The control circuit 16 provides the bandwidth variable interleaver 12 with a control signal for coarsely setting the grid spacing g2 of the bandwidth variable interleaver 12 at the standard grid spacing g1 of the optical carriers on the basis of an initial set value. The bandwidth variable interleaver 12 coarsely sets the grid spacing g2 on the basis of that control signal (the details of the initial set value are described below).

[S3] The monitor 15 monitors the light intensity of a composite light output from the optical coupler 14 and sends a monitoring result to the control circuit 16.

[S4] The control circuit 16 calculates the difference between a peak value and a bottom value of the composite light from the monitoring result. The control circuit 16 varies the grid spacing g2 of the bandwidth variable interleaver 12 in the direction in which the difference is the largest using the control signal to carry out grid-spacing adjustment.

[S5] The control circuit 16 determines the peak value of the composite light from the monitoring result. The control circuit 16 varies the center frequency in the filter characteristic of the bandwidth variable interleaver 12 in the direction in which the peak value is the highest using the control signal to carry out center-frequency adjustment.

[S6] The control circuit 16 fixes the settings at the grid spacing g2 adjusted in step S4 and the center frequency adjusted in step S5. The bandwidth variable interleaver 12 filters the optical carriers using the set filter characteristic and starts operation of the optical transmission apparatus 10. The control circuit 16 checks a result of monitoring during the operation and performs fine adjustment of the grid spacing and center frequency on the bandwidth variable interleaver 12.

Next, the initial set value is described. The control circuit 16 makes coarse setting of coarsely setting the grid spacing g2 of the bandwidth variable interleaver 12 at the standard grid spacing g1 at the time of initial operation setting. Thus, an initial setting table in which an initial set value for use in making the coarse setting is stored in an internal memory.

Here, the filter characteristic of the bandwidth variable interleaver 12 can be varied by a change in the refractive index of an optical waveguide in the bandwidth variable interleaver 12 caused by a temperature change in the optical waveguide, for example.

Accordingly, when the bandwidth variable interleaver 12 has the filter characteristic that is changed by a change in the refractive index of the waveguide caused by a temperature change, grid spacings and temperature values (which can be set from a maintenance terminal) are stored in attribute items of the initial setting table.

For example, the grid spacings and temperature values can be stored in such a way that, for the settings in which the grid spacing is 25 GHz, the temperature to be provided to the optical waveguide is A° C., and, for the settings in which the grid spacing is 50 GHz, the temperature to be provided to the optical waveguide is B° C.

Accordingly, to coarsely set the grid spacing at 25 GHz, the control circuit 16 outputs a control signal at which A° C. is to be provided to the optical waveguide of the bandwidth variable interleaver 12 on the basis of a stored value in the initial setting table. The bandwidth variable interleaver 12 changes the temperature of an internal temperature setting element using that control signal and thus changes the refractive index of the optical waveguide to coarsely set the grid spacing.

The use of the temperature setting described above is not limited to the coarse setting. When the bandwidth variable interleaver 12 has the configuration described above, also in the grid-spacing adjustment and center-frequency adjustment, the filter characteristic is controllable by such temperature setting.

The filter characteristic of the bandwidth variable interleaver 12 can also be varied by a change in the optical path length caused by a change in the angle position of, for example, a mirror element used in a spatial optical system. Accordingly, when the bandwidth variable interleaver 12 has the filter characteristic that is changed by a change in the optical path length caused by a change in the angle position of the mirror element, grid spacings and angle values of the mirror element (which can be set from a maintenance terminal) are stored in attribute items of the initial setting table.

For example, the grid spacings and angle values can be stored in such a way that, for the settings in which the grid spacing is 25 GHz, the angle to be provided to the mirror element is C degree(s), and, for the settings in which the grid spacing is 50 GHz, the angle to be provided to the mirror element is D degree(s).

Accordingly, to coarsely set the grid spacing at 25 GHz, the control circuit 16 outputs a control signal at which C degree(s) is to be provided to the mirror element of the bandwidth variable interleaver 12 on the basis of a stored value in the initial setting table. The bandwidth variable interleaver 12 drives the internal mirror element driving unit using that control signal and thus changes the optical path length to coarsely set the grid spacing.

The use of the mirror angle setting described above is not limited to the coarse setting. When the bandwidth variable interleaver 12 has the configuration described above, also in the grid-spacing adjustment and center-frequency adjustment, the filter characteristic is controllable by such mirror angle setting.

Next, bandwidth variable interleaving control is described using specific waveform spectrums. An example case where the WDM scheme (with a frequency spacing of optical carriers of 50 GHz) is discussed below.

Figure 12:
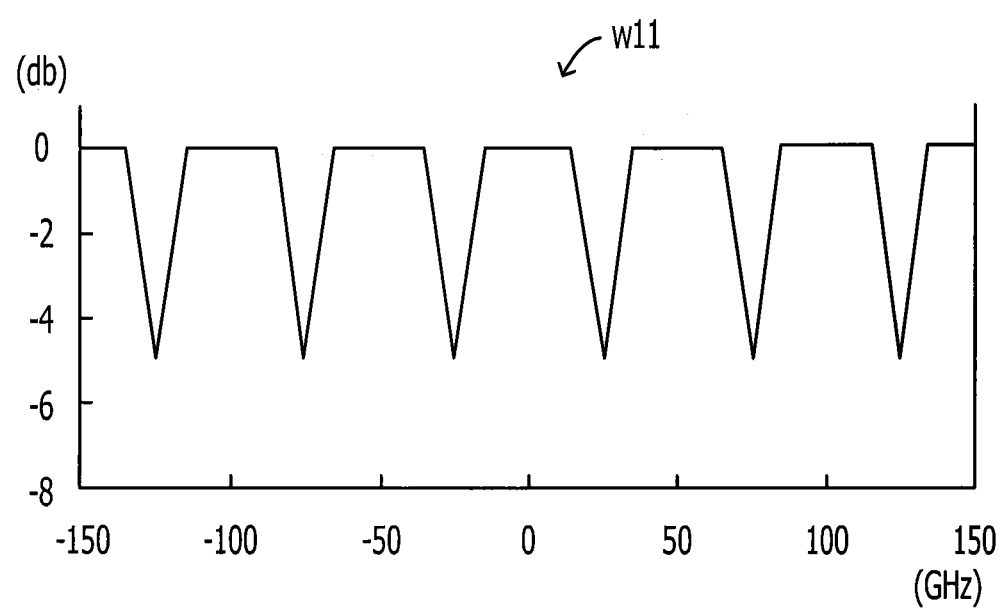
FIG. 12 illustrates a filter characteristic of the bandwidth variable interleaver.
Figure 13:
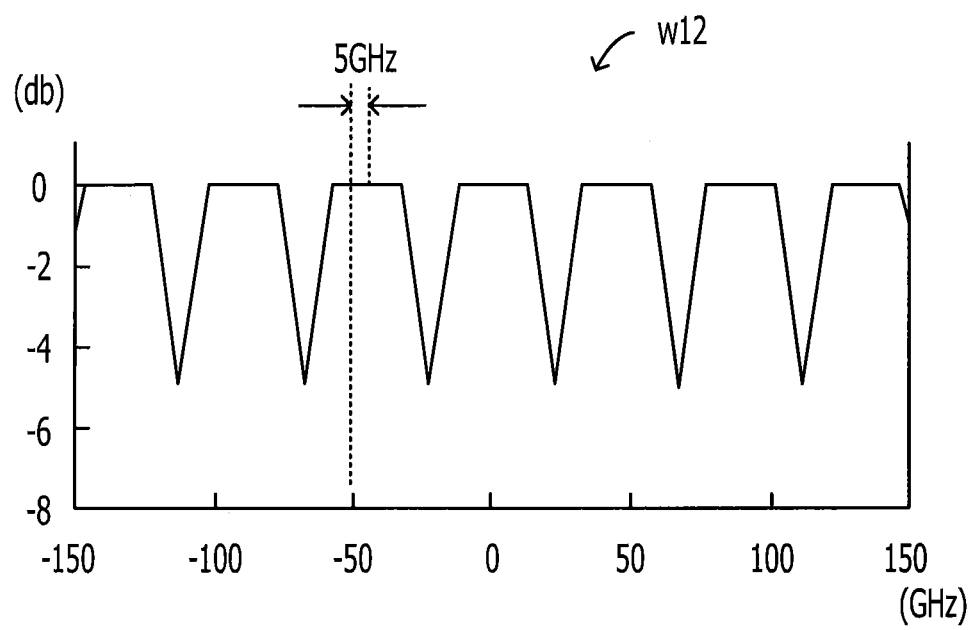
FIG. 13 illustrates a filter characteristic of the bandwidth variable interleaver.

FIGS. 12 and 13 illustrate filter characteristics of the bandwidth variable interleaver. The vertical axis indicates the transmission characteristic (dB). The horizontal axis indicates the relative frequency (GHz) to the center frequency of optical carriers output from the frequency comb light source 11c.

A waveform spectrum w11 illustrated in FIG. 12 indicates the transmission characteristic when the grid spacing g2 of the bandwidth variable interleaver 12 is 50 GHz. In this case, the grid spacing g2 of the bandwidth variable interleaver 12 and the standard grid spacing g1 of the optical carriers output from the frequency comb light source 11c are the same 50 GHz.

A waveform spectrum w12 illustrated in FIG. 13 indicates the transmission characteristic when the grid spacing g2 of the bandwidth variable interleaver 12 is 45 GHz. In this case, the grid spacing g2 of the bandwidth variable interleaver 12 is 45 GHz, whereas the standard grid spacing g1 of the optical carriers output from the frequency comb light source 11c is 50 GHz. Thus, a difference of 5 GHz is present.

Figure 14:
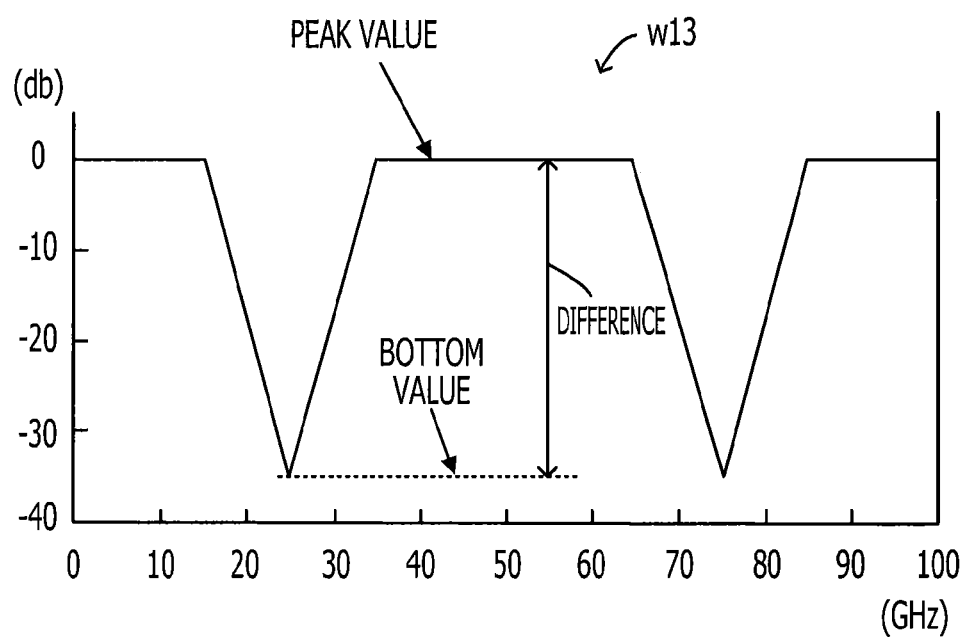
FIG. 14 illustrates a light intensity of a composite light.
Figure 15:
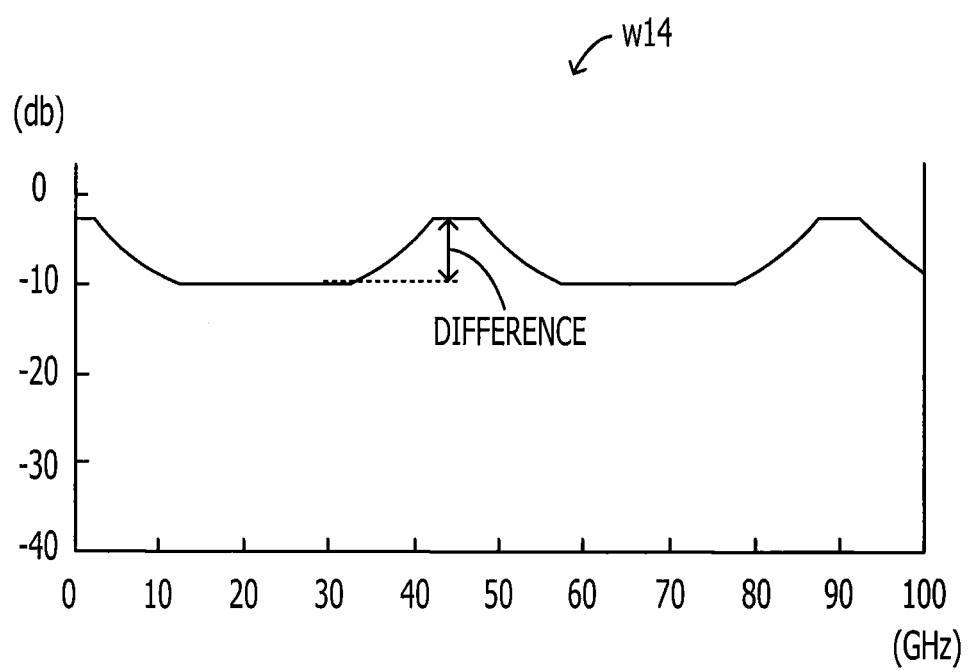
FIG. 15 illustrates a light intensity of a composite light.

FIGS. 14 and 15 illustrate the light intensity of a composite light when the center frequency in the filter characteristic of the bandwidth variable interleaver is changed. The vertical axis indicates the relative value (dB) of the light intensity of a composite light detected by the monitor 15. The horizontal axis indicates the amount of change (GHz) in the center frequency in the filter characteristic of the bandwidth variable interleaver 12 to the center frequency of optical carriers output from the frequency comb light source 11c.

A waveform spectrum w13 illustrated in FIG. 14 indicates the spectrum of the light intensity of a composite light in the transmission characteristic illustrated in FIG. 12, where the grid spacing g2 of the bandwidth variable interleaver 12 is 50 GHz.

A waveform spectrum w14 illustrated in FIG. 15 indicates the spectrum of the light intensity of a composite light in the transmission characteristic illustrated in FIG. 13, where the grid spacing g2 of the bandwidth variable interleaver 12 is 45 GHz.

FIGS. 14 and 15 reveal that in the case illustrated in FIG. 14, where no grid gap occurs and the grid spacings are the same, the difference between the peak value and the bottom value of the composite light is the largest, whereas in the case illustrated in FIG. 15, where a grid gap occurs, the difference is not the largest.

Accordingly, it is possible to equalize the grid spacing g2 of the bandwidth variable interleaver 12 with the standard grid spacing g1 by varying the grid spacing g2 in the filter characteristic of the bandwidth variable interleaver 12 in the direction in which the difference between the peak value and the bottom value of the composite light is the largest.

The location where the peak value of the composite light is the largest is the location where the center frequency of optical carriers and the center frequency in the filter characteristic of the bandwidth variable interleaver 12 are the same. Accordingly, it is possible to equalize the center frequency in the filter characteristic of the bandwidth variable interleaver 12 with the center frequency of optical carriers by varying the center frequency in the filter characteristic of the bandwidth variable interleaver 12 in the direction in which the peak value of the composite light is the highest.

Figure 16:
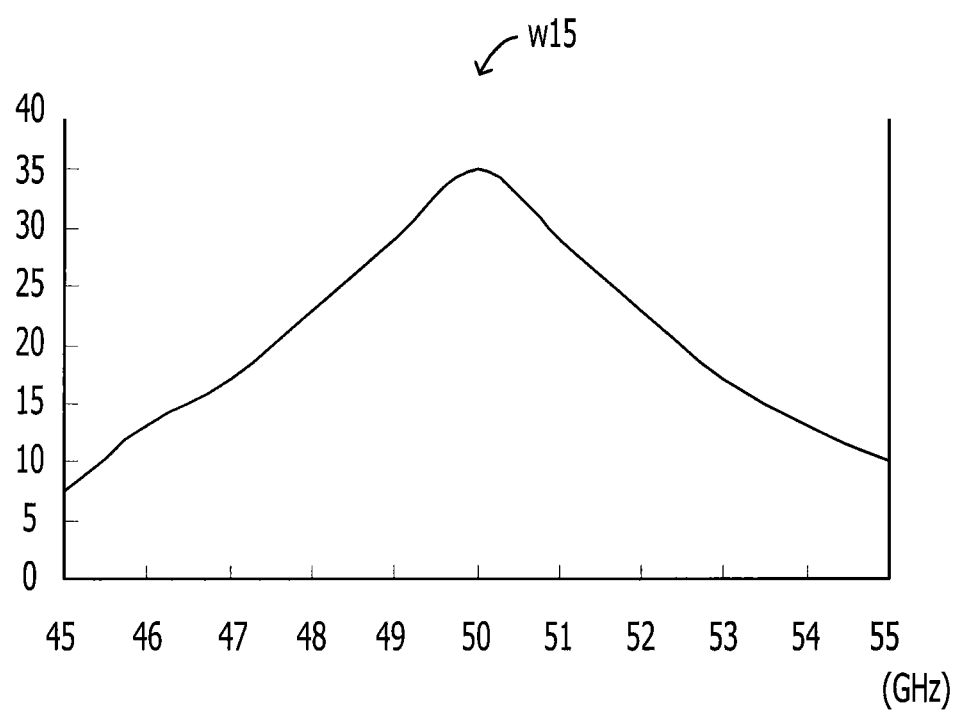
FIG. 16 illustrates a difference between a peak value and a bottom value of a composite light.

FIG. 16 illustrates the difference between the peak value and the bottom value of a composite light. The vertical axis indicates the difference (dB) between the peak value and the bottom value of a composite light. The horizontal axis indicates the grid spacing (GHz) in the filter characteristic of the bandwidth variable interleaver 12.

In a waveform spectrum w15, where the grid spacing g2 of the bandwidth variable interleaver 12 and the standard grid spacing g1 of optical carriers output from the frequency comb light source 11c are the same 50 GHz, the maximum value of the difference is 35 dB. Accordingly, the grid spacing g2 is varied in the direction in which the difference is 35 dB.

Figure 17:
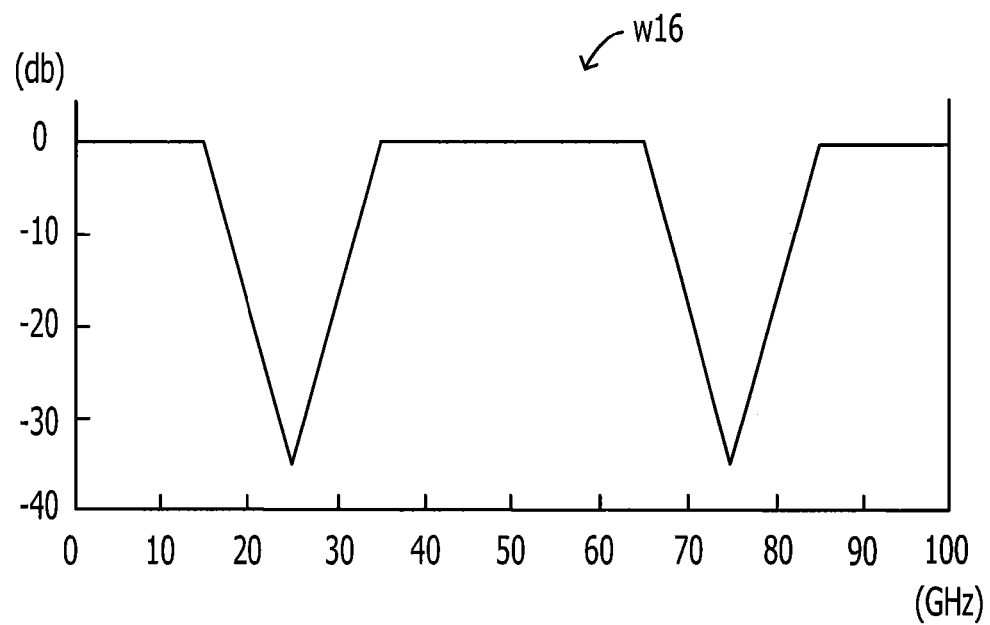
FIG. 17 illustrates a spectral after grid-spacing adjustment and center-frequency adjustment.

FIG. 17 illustrates the spectrum after the grid-spacing adjustment and the center-frequency adjustment. The vertical axis indicates the relative value (dB) of the light intensity of a composite light detected by the monitor 15. The horizontal axis indicates the adjustment difference (GHz) between the center frequency in the filter characteristic of the bandwidth variable interleaver 12 and the center frequency of optical carriers output from the frequency comb light source 11c.

In a waveform spectrum w16, owing to the grid-spacing adjustment, the grid spacing g2 in the filter characteristic of the bandwidth variable interleaver 12 is the same as the standard grid spacing g1 of optical carriers output from the frequency comb light source 11c; and owing to the center-frequency adjustment, the center frequency in the filter characteristic of the bandwidth variable interleaver 12 is the same as the center frequency of optical carriers output from the frequency comb light source 11c. The optical transmission apparatus starts its operation in such an adjusted state.

As described above, the optical transmission apparatus is configured to monitor a composite light output from the interleaver, calculate the difference between the peak value and the bottom value of the composite light on the basis of a monitoring result, vary the grid spacing in the filter characteristic of the interleaver in the direction in which that difference is the largest, and vary the center frequency in the filter characteristic of the interleaver in the direction in which the peak value is the highest. This can achieve bandwidth variable interleaving.

As described above, optical carriers having a desired standard grid spacing are subjected to the grid-spacing adjustment of varying the grid spacing in the filter characteristic of the interleaver and thus equalizing the grid spacing with the standard grid spacing and the center-frequency adjustment of varying the center frequency in the filter characteristic and thus equalizing the center frequency in the filter characteristic with the center frequency of optical carriers. This enables the optical transmission apparatus to adaptively deal with various multiplexing schemes and various optical modulation schemes and thus enables the single apparatus to support any multiplexing scheme and any optical modulation scheme.

Figure 18:
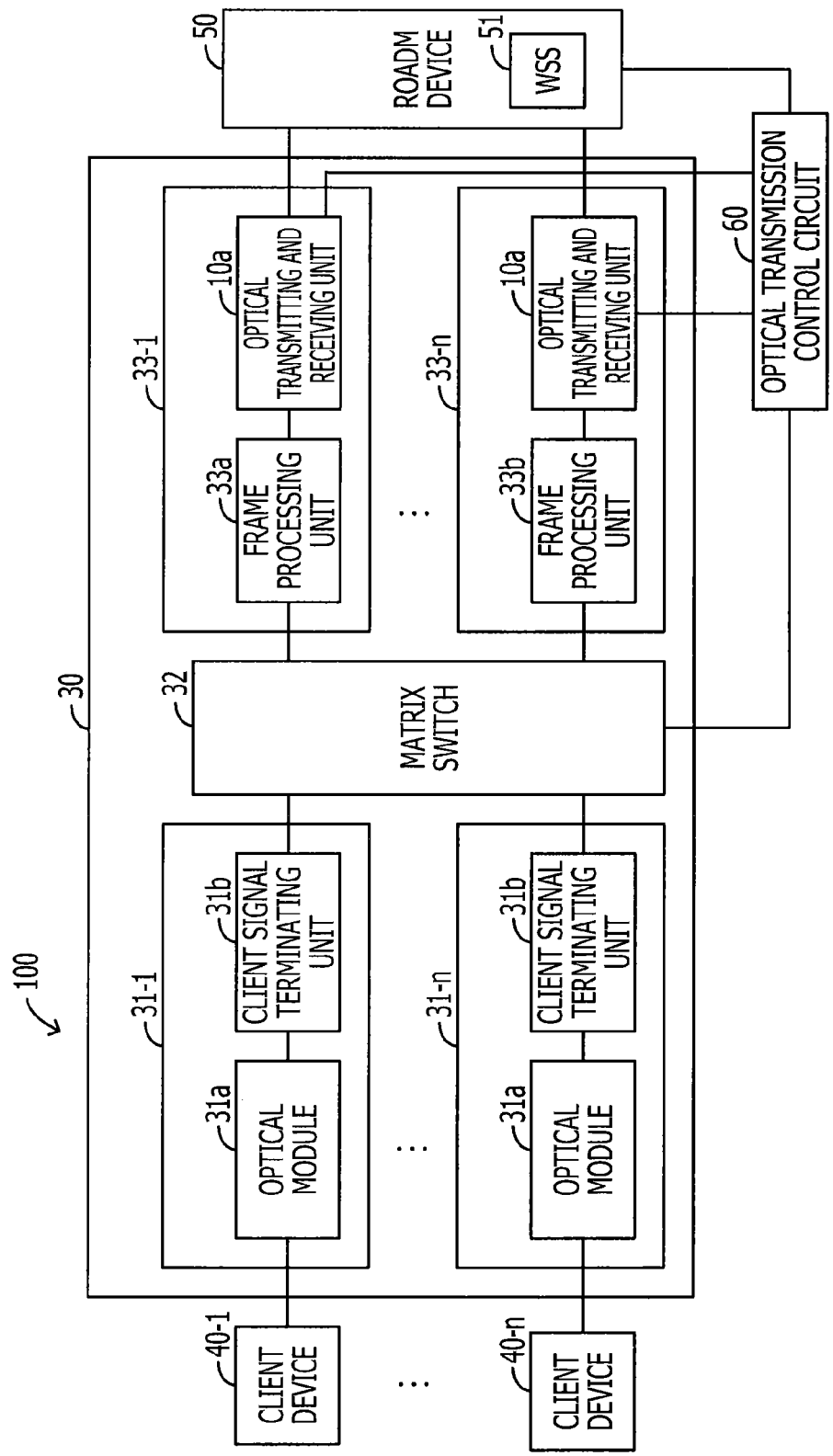
FIG. 18 illustrates an example configuration of an optical transmission system.

Next, an example configuration of an optical transmission system that has the functions of the optical transmission apparatus 10 is described. FIG. 18 illustrates an example configuration of the optical transmission system. An optical transmission system 100 includes a bandwidth variable transponder 30, client apparatuses 40-1 to 40-n, a reconfigurable optical add/drop multiplexer (ROADM) apparatus 50, and an optical transmission control circuit 60.

The bandwidth variable transponder 30 includes client holding units 31-1 to 31-n, a matrix switch 32, and transmission processing units 33-1 to 33-n. Each of the client holding units 31-1 to 31-n includes an optical module 31a and a client signal terminating unit 31b. Each of the transmission processing units 33-1 to 33-n includes a frame processing unit 33a and an optical transmitting and receiving unit 10a.

The optical transmitting and receiving unit 10a has the functions of the components of the optical transmission apparatus 10 illustrated in FIG. 4 other than the control circuit 16. The optical transmission control circuit 60 has the function of the control circuit 16 illustrated in FIG. 4.

The client apparatuses 40-1 to 40-n are connected to the optical modules 31a in the client holding units 31-1 to 31-n, respectively. The optical modules 31a receive optical signals sent from the client apparatuses 40-1 to 40-n and convert them from optical to electrical. Alternatively, each of the optical modules 31a converts a client signal sent from the client signal terminating unit 31b from electrical to optical.

The client signal terminating unit 31b terminates a signal sent from the optical module 31a or the matrix switch 32. The matrix switch 32 performs switching processing based on a switching instruction from the optical transmission control circuit 60 and outputs a reception signal through a predetermined port. The frame processing unit 33a performs address resolution processing, error correction processing, and other processing as frame processing.

The optical transmitting and receiving unit 10a performs optical transmission/reception processing on the basis of a control instruction from the optical transmission control circuit 60. The ROADM apparatus 50 includes the WSS 51 and performs add/drop control of an optical signal having a specified wavelength on the basis of a wavelength add (insertion)/drop (split) instruction from the optical transmission control circuit 60.

The optical transmission control circuit 60 is connectable to a maintenance terminal (not illustrated), receives settings relating to operation from the maintenance terminal, and transmits various control instructions described above to predetermined components. The optical transmission control circuit 60 also controls displaying of an operation state to the maintenance terminal.

Figure 19:
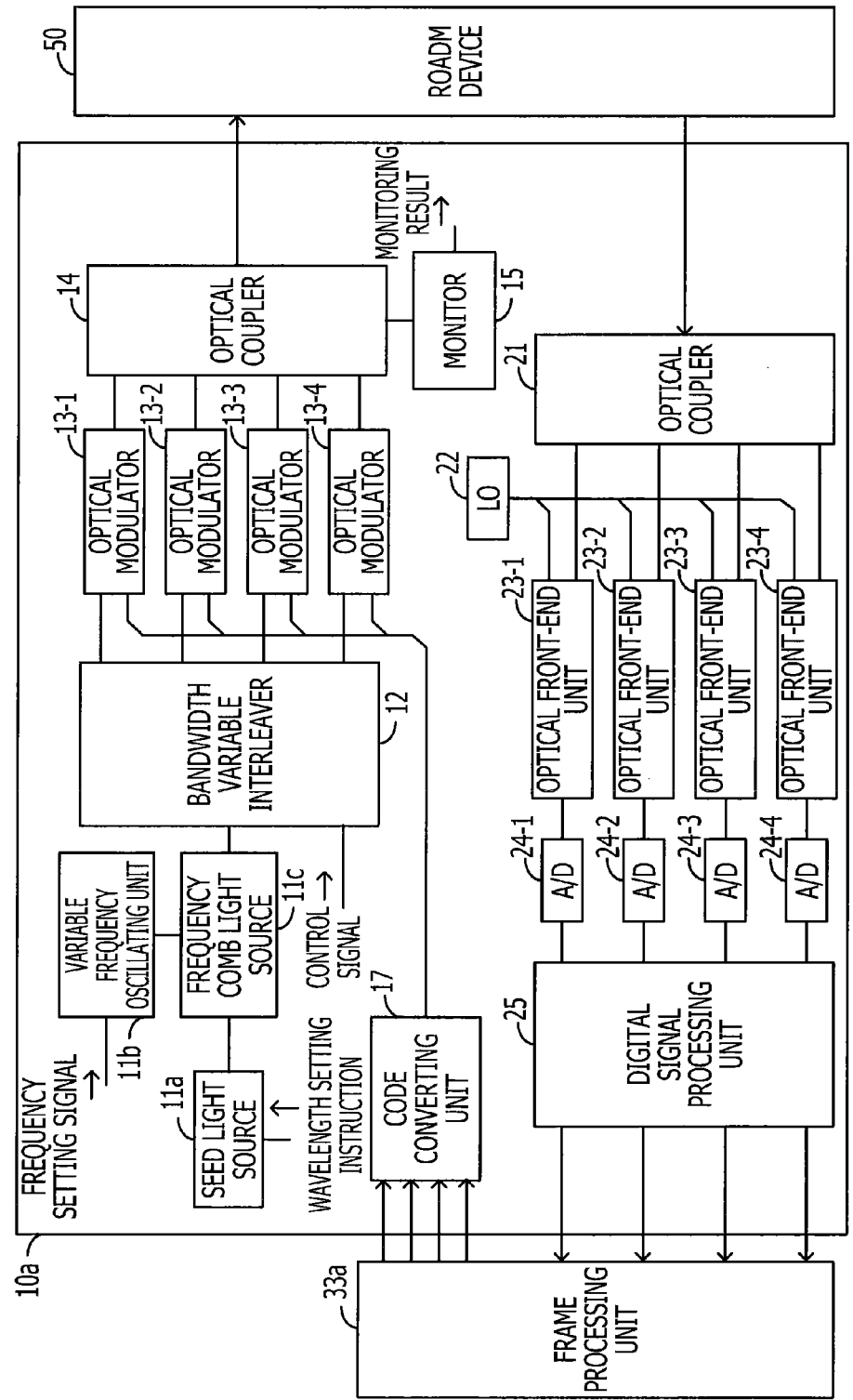
FIG. 19 illustrates an example configuration of an optical receiving unit.

FIG. 19 illustrates an example configuration of the optical transmitting and receiving unit. The optical transmitting and receiving unit 10a includes the seed light source 11a, the variable frequency oscillating unit 11b, the frequency comb light source 11c, the bandwidth variable interleaver 12, the optical modulators 13-1 to 13-4, the optical coupler 14, the monitor 15, a code converting unit 17, an optical coupler 21, a local oscillator (LO) 22, an optical front-end units 23-1 to 23-4, analog-to-digital (A/D) units 24-1 to 24-4, and a digital signal processing unit 25.

Of the components relating to processing proceeding in the direction from the frame processing unit 33a to the ROADM apparatus 50, the components described above in FIG. 4 are not described here. The code converting unit 17 codes a digital signal sent from the frame processing unit 33a into a subcarrier or a multi-level code, converts the signal from digital to analog, and generates an analog signal. The code converting unit 17 sends the analog signal to the optical modulators 13-1 to 13-4. Each of the optical modulators 13-1 to 13-4 optically modulates an optical carrier output from the bandwidth variable interleaver 12 using that analog signal.

In signal processing proceeding in the direction from the ROADM apparatus 50 to the frame processing unit 33*a*, digital coherent reception is carried out. The optical coupler 21 splits a light output from the ROADM apparatus 50.

The LO 22 variably sets the oscillation frequency and outputs a local oscillation light. Each of the optical front-end units 23-1 to 23-4 mixes the optical signal from the optical coupler 21 and the local oscillation light and outputs a baseband signal that corresponds to electric field information about an electric field of the optical signal (phase and strength of the light). Each of the optical front-end units 23-1 to 23-4 has the optical-to-electrical (O/E) converting function and converts the baseband signal being the electric field information into an analog electrical signal.

Each of the A/D units 24-1 to 24-4 quantizes the analog signal containing the electric field information with a sampling timing at a predetermined sampling clock, converts it into a digital signal, and outputs the digital signal.

The digital signal processing unit 25 receives the digital signal, demodulates it by detection performed by digital signal processing, generates a client signal, and outputs the client signal to the frame processing unit 33*a*.

As described above, the optical transmission apparatus is configured to variably control and adjust the grid spacing and the center frequency in the filter characteristic of the interleaver on the basis of a control signal. This enables bandwidth variable interleaving.

Because bandwidth variable interleaving is enabled, a single apparatus can flexibly select and also set a multiplexing scheme and an optical modulation scheme that are best suited for a transmission system. Thus, the system scale, power consumption, and cost can be reduced.

The configuration of each unit described in the embodiments illustrated above can be replaced with another one having a similar function. Any other structure and process may also be added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
    an interleaver configured to filter an optical carrier;
    a multiplexer configured to combine lights output from the interleaver to generate a composite light;
    a monitor configured to monitor a light intensity of the composite light; and
    a control circuit configured to change a grid spacing in a filter characteristic of the interleaver in a direction in which an amount of change in a light intensity of the composite light increases, on the basis of a monitoring result measured while changing a center frequency in the filter characteristic of the interleaver and to change the center frequency in the filter characteristic in a direction in which a maximum value of the light intensity increases, on the basis of the monitoring result.

2. The optical transmission apparatus of claim 1,
    wherein the control circuit is configured to change the grid spacing in the filter characteristic of the interleaver in a direction in which a difference between a maximum value and a minimum value of the light intensity of the composite light increases, on the basis of the monitoring result.

3. The optical transmission apparatus of claim 1, further comprising
    a light source configured to generate an optical carrier to be input to the interleaver, the optical carrier being wavelength-variable,
    wherein the control circuit is configured to control a wavelength of the optical carrier to be input from the optical-carrier generating unit to the interleaver.

4. An optical interleaving control method comprising:
    filtering, by an interleaver, an optical carrier that is wavelength-multiplexed with a first grid spacing, while changing a center frequency in a filter characteristic of the interleaver in which a second grid spacing is set;
    monitoring a light intensity of a composite light of output lights filtered by the interleaver;
    changing the second grid spacing in a direction in which an amount of change in the light intensity increases; and
    changing a center frequency in the filter characteristic in a direction in which a maximum value of the light intensity increases.

5. The optical interleaving control method of claim 4,
    wherein the changing the second grid spacing includes changing the second grid spacing in the filter characteristic of the interleaver in a direction in which a difference between a maximum value and a minimum value of the light intensity of the composite light increases, on the basis of a monitoring result of the light intensity of the composite light.

6. The optical interleaving control method of claim 4, further comprising
    generating an optical carrier to be input to the interleaver, the optical carrier being wavelength-variable, and
    controlling a wavelength of the optical carrier to be input to the interleaver.

* * * * *